United States Patent [19]

Vlahos et al.

[11] 3,772,465

[45] Nov. 13, 1973

[54] IMAGE MODIFICATION OF MOTION PICTURES

[75] Inventors: Petro Vlahos, Tarzana; Wilton R. Holm, Santa Monica, both of Calif.

[73] Assignee: The Association of Motion Picture and Television Producers Inc., Los Angeles, Calif.

[22] Filed: June 9, 1971

[21] Appl. No.: 151,254

[52] U.S. Cl...... 178/5.2 D, 178/5.4 AC, 178/6.7 A, 352/38, 355/40

[51] Int. Cl.... G03b 21/52, G03b 33/00, H04n 5/88

[58] Field of Search...................... 178/6.6 A, 6.7 A, 178/5.4 AC, 5.2 D; 352/38; 355/40

[56] References Cited

UNITED STATES PATENTS

| | | | |
|---|---|---|---|
| 3,558,811 | 1/1971 | Montevecchio | 178/6 |
| 3,005,042 | 10/1961 | Horsley | 178/6.7 A |
| 3,617,626 | 11/1971 | Bluth | 178/6.6 A |

*Primary Examiner*—Howard W. Britton
*Attorney*—Charlton M. Lewis

[57] ABSTRACT

Individual image areas of a previously recorded motion picture scene can be modified electronically despite relative movement of such areas from frame to frame. Video values for each image element are stored in digital form in the memory of a general purpose computer in association with identifying addresses. A selected object area to be modified is then defined by a list of addresses of the image elements bounding the object. Such boundary addresses are derived partly manually or visually by reference to a CRT display of a selected frame, with assistance from the suitably programmed computer which automatically extends the boundary address list from frame to frame. The computer is then programmed to recover from memory the video values for image elements within the area defined by each boundary address list, to perform the desired modification of each value, and to return the modified values to memory. The modification of each value typically requires reference to other image elements in the same frame or to corresponding image elements of adjacent frames, with computation of functions such as averages of the video values for such elements. Useful types of modification include changes of definition, contrast, hue and brightness, elimination of unwanted objects, reduction of graininess and other random noise, and insertion of color. After completion of the desired modification, each frame or group of frames is again recorded photographically, magnetically or on any desired storage medium.

6 Claims, 7 Drawing Figures

INVENTORS.
PETRO VLAHOS,
WILTON R. HOLM,
By

INVENTORS.
PETRO VLAHOS,
WILTON R. HOLM,
By Charlton M. Lewis

IMAGE MODIFICATION OF MOTION PICTURES

This invention has to do generally with the controlled modification of previously recorded motion picture images, which may be recorded directly on photographic film or in the form of video signals on magnetic tape, magnetic disk, or other storage medium.

A primary object of the invention is to permit convenient and effective image modification of one area of a picture without affecting other areas. The area to be modified ordinarily corresponds to a particular object, or a particular portion of an object, that is visually distinguishable from the rest of the picture.

A further object of the invention is to permit the convenient identification, in successive frames of a motion picture scene, of the picture portions that correspond to a selected object, despite movement of the object relative to the frame boundary. Such movement may, of course, result from mutual movement of the various objects in the scene, or from camera movement. By suitably identifying the areas of successive frames that correspond to a selected moving object, the invention permits a defined type of image modification to be carried out on that object throughout a motion picture scene.

As a brief summary of the present invention, the scene to be modified is converted from the original storage medium to electronic form, and an electronic computer with suitable memory function is employed to manipulate the component elements of the resulting video signal. In particular, the computer is programmed to assist in generating an electronic identification of the portions of the picture to be modified, with reference to a selected frame, and to generate corresponding identification for adjacent frames, thus effectively following a moving object throughout a motion picture scene. The identifying data, typically comprising a list of addresses of specific picture elements in the respective frames, is placed in memory. The computer is further programmed to perform the desired modification of the video record only within the portions corresponding to the generated address list. The modified video record is then converted back to photographic or other recorded form, reestablishing the original motion picture scene except that the selected area has a modified appearance.

A wide variety of types of image modification are of practical value. Illustrative examples of such operations include the following: Enhancing the sharpness of boundaries; decreasing the sharpness or resolution of all subdividions within the boundaries of an object; increasing or decreasing the brightness (luminance) of an object; altering the hue or purity of the color of an object; eliminating an object from the scene; eliminating nonrecurring noise, such as film grain, dirt and random scratches; eliminating recurring noise, such as flicker and linear scratches; modifying the contrast of an object with respect to other objects; and assigning colors to objects that are initially without color.

Methods are known by which some of those types of image modification may be performed on the entire picture area. However, those methods are not capable of selectively modifying a limited region of the picture that shifts position in successive frames of a motion picture scene.

In accordance with the present invention, if the motion picture scene to be modified is initially in photographic form, it is scanned electroncailly frame by frame to produce a video record. If the motion picture is in color, the video record includes color information, normally comprising three distinct video signals representing the red, green and blue components of the picture. Alternatively, the color information may be in the form of the ratio of two of those color components to the third, for example. If each frame of the scene is scanned by a succession of horizontal scan lines, as will be assumed for clarity of description, each point of the frame can be identified by two numbers or addresses, X and Y, of which Y represents the number of the horizontal scan and X may be defined alternatively, for example, as representing the time with respect at the start time of the scan, the instantaneous value of the sweep voltage producing the scan, or simply the number of the picture element, counting elements of arbitrary size along the length of the scan.

The invention further utilizes a computer, typically of general purpose type, which includes a memory for temporarily storing information, and which can be programmed to perform specified operations on the information that is stored. The memory may be of disk or core type, for example, and is typically of conventional construction. The video record values for selected frames, or for selected portions of frames, are stored in the computer memory with the video values for each picture element associated with the X, Y address for that element. The values for any desired address can then be recovered selectively from the computer memory in known manner, and the computer can be programmed to perform any desired operation upon those selected values. Such an operation typically leads to modified video values, which are then returned to the memory for further use. The stores video values for an entire frame can readily be recovered and displayed in known manner, typically on a cathode ray tube. The operation is thus enabled to monitor the initial scanning action and to observe the actual result of any operation that has been performed upon the video record. Such a display may include an entire frame, or may be expanded electronically to fill the display with only a small selected part of the image. In the expanded mode the scan lines are clearly separated and the individual picture elements may be made clearly visible.

When the video record is displayed on a cathode ray tube, several techniques are known by which the computer can be informed of the address of any point of the display selected by the operator. For example, the operator may manually direct a so-called light pen at the selected picture element. As that element is illuminated by the cathode ray beam, a photo-responsive element in the light pen transmits to the computer an electrical pulse, identifying by time coincidence the address of the element being displayed. The computer may be programmed to store or otherwise utilize such a designated address. Also, an address that has been conveyed to the computer, as in the manner just described, or that has been generated by the computer in response to a programmed operation, can be made visible to the operator, typically by intensification or blinking of the corresponding display element. The operator can thus check accuracy of the designated address.

The invention can utilize video information in analog form, and can employ addresses for the respective picture elements also in analog form, corresponding typically to specific values of the X and Y sweep voltages from the scan control generator. However, to enhance stability and accuracy it is ordinarily preferred to operate with the video record and the picture element addresses both in digital form. Each digital value is typically represented by a suitable binary digital code with as many digits as are required to produce the desired accuracy. The video record is typically first generated in analog form, and is translated to digital form by an analog-to-digital converter of conventional type. The digital addresses are typically generated initially in digital form under control of a counting device or a master clock, and the analog deflection voltages required for scanning the picture image and for deflecting the cathode ray beam of the display tube or the like are then developed for each address by digital-to-analog conversion. The picture elements of each scan line then typically appear in a display as discrete dots; and it is possible, if desired, to display or otherwise operate on selected picture elements in any desired order, without reference to any rigid scan pattern.

The generation of a set of addresses for identifying a selected picture area to be modified is typically carried out progressively in the following manner, which illustrates how the computer can be employed to speed up a procedure that can alternatively be performed largely or entirely by hand. In the electronic picture display of a selected frame, the operator selects a scan line that passes through an object he desires to modify. A picture element near one boundary of the object is identified by the light pen or equivalent device. The computer is programmed to compare the video record at a series of addresses near the position indicated, and to determine the critical point at which a specified video characteristic undergoes a defined change. The selected characteristic may be any desired function of brightness or hue, such as the absolute value of a particular color component of the video record, or the ratio of two color components, for example. The critical point may be defined, for example, as the point of steepest slope of the selected function, or the midpoint of the shape between two plateaus. The address of the point so determined is taken as the object boundary for that scan line. The opposite boundary is similarly identifed, and the two boundary addresses are placed in memory.

The computer is then directed to search for a similar change in brightness or hue at neighboring addresses on adjacent scan lines. A continuation of this process locates all the addresses that represent boundaries of the selected object. All of the selected boundary addresses are preferably displayed, as by brightening or blinking, for visual verification by the operator.

The computer is further programmed to search progressively the video values for adjacent frames, applying the same criteria to groups of addresses near each of the boundary addresses that were generated for the first frame. Since movement of an object is typically small during the time between successive frames, the boundary addresses are correspondingly similar, and a restricted search distance is usually sufficient. By monitoring the resulting machine-generated addresses in the manner already described, the operator can correct any errors, and can modify the program instructions as required to take account of any special conditons that may be encountered, such as a change of the hue or brightness of the background surrounding the selected object, as the generation of addresses proceeds. All of the resulting addresses are stored for later reference, with suitable data identifying the frames to which they apply.

If more than one object or picture area is to be modified, identifying numbers are assigned to the respective objects and are associated with the corresponding address lists. Under some conditions it is more convenient to generate and store addresses for only a small number of frames at one time, three frames being usually the minimum practicable number. The procedure is then extended progressively to further frames as modification of the first ones is completed.

A full understanding of the invention, and of its further objects and advantages, will be had from the following description of preferred methods and apparatus for carrying it out. The particulars of that description, and of the accompanying drawings which form a part of it, are intended only as illustration and not as a limitation upon the scope of the invention, which is defined in the appended claims. In the drawings:

Figure 1:
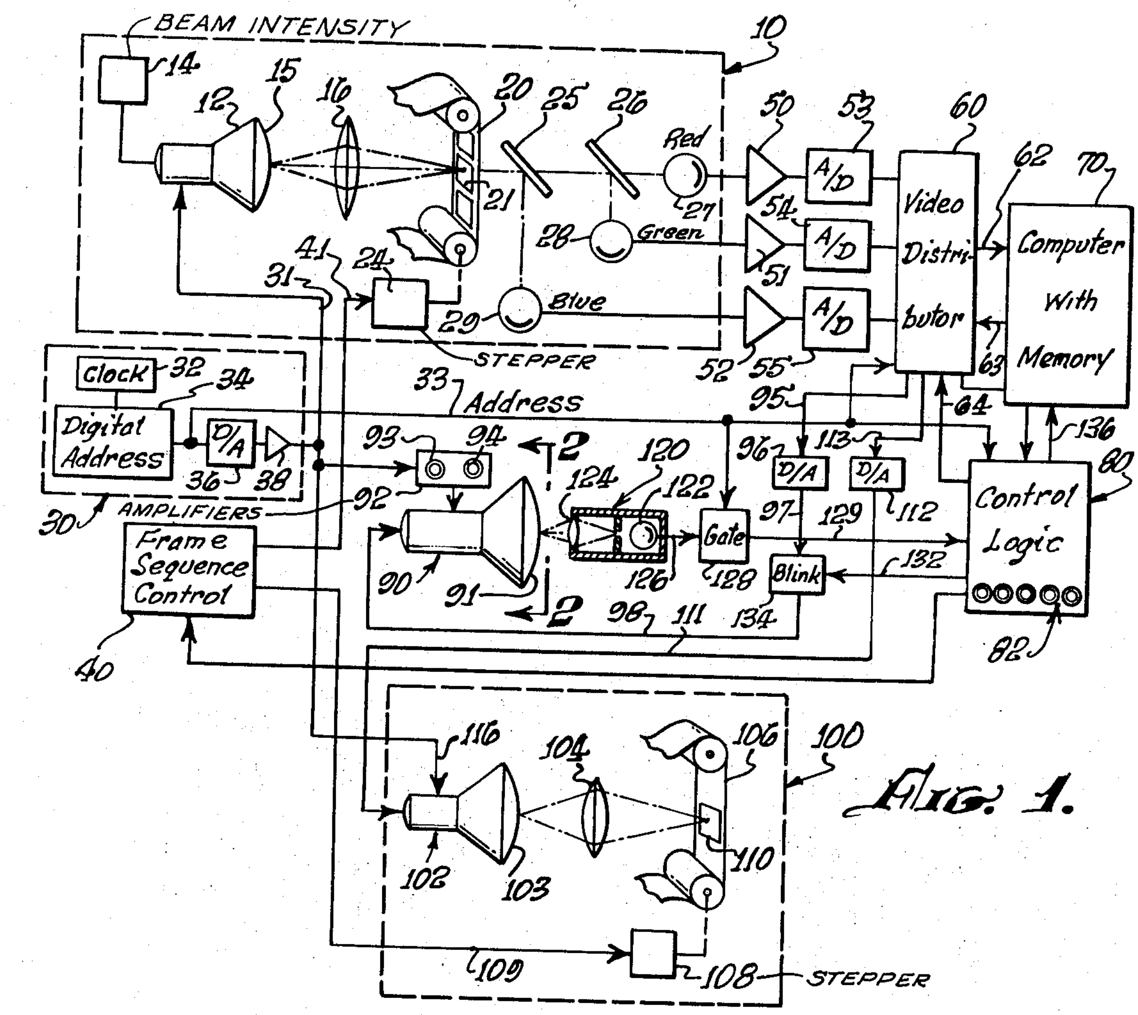
FIG. 1 is a schematic drawing representing an illustrative system for practicing the invention.

An illustrative image modification system in accordance with the invention is shown in schematic form in FIG. 1, which assumes for illustration that the images to be modified are recorded on the photographic film 20. The images to be modified are converted to color video signals by any suitable type of film scanning system, such as a three-vidicon scanner or a flying spot cathode ray tube scanner, for example. The latter type is shown illustratively at 10, with the cathode ray tube 12 receiving beam deflection voltages for the X and Y coordinates from the scan control generator indicated at 30. Generator 30 typically comprises circuitry 34 acting under control of the clock 32 to develop digital address signals for identifying successive image elements, digital-to-analog (D/A) converter 36 for producing corresponding X and Y deflection signals, and circuitry 38 for amplifying those signals to produce X and Y deflection voltages. Those deflection signals are supplied via the cable 31 to the flying spot CRT 12 or its equivalent and to any other CRT's in the system that are to be operated in synchronism with it. Separate channels are typically provided for the X and Y components, but only a single channel is shown for clarity of illustration. The beam intensity in CRT 12 is maintained normally constant by circuitry indicated at 14, but may be extinguished during beam movement between image elements. The resulting grid pattern of successively illuminated dots on the CRT screen 15 is imaged by the lens 16 on the motion picture film 20, coinciding with a single frame 21 of that film. Film 20 is supported in a typical film gate, not shown, and is shiftable longitudinally by the stepping device 24 to position any selected frame for scanning. Device 24 shifts the film forward or back in response to suitable signals supplied via the cable 41 from a conventional frame sequence control 40, which may be, for example, the Phototron drive system employed in the Model 2101 Optical Printer, made by Research Products, Inc.

Light transmitted by film 20 in response to periodic illumination of each image element is divided into red, green and blue components by the partially reflecting mirrors 25 and 26, and the components are sensed by the respective photosensors 27, 28 and 29. The resulting video component signals are amplified, equalized and otherwise shaped as may be required by the amplifiers 50, 51 and 52, and are translated to digital form by the A/D converters 53, 54 and 55. The resulting digital video signals, typically comprising binary digital code representations of the three color component values for the successively scanned image elements, are supplied to the video distribution circuit 60 for supply to various parts of the system as required. Video distribution circuit 60 may be, for example, a Xerox Model 7923 Analog-Digital Adaptor.

If the motion picture to be modified is initially provided in the form of a television video tape recording, for example, the video signal is typically read from the tape by a tape reproducer of any suitable type, and the color video information is supplied to analog-to-digital converters such as 50, 51 and 52 of FIG. 1. Such color information may be transformed in known manner as required between such equivalent forms as red, green and blue signals, on the one hand, and chrominance and intensity signals, on the other hand.

The digital video signals for each image element are combined in known manner in video distribution circuit 60 with the corresponding digital address signal, supplied from generator 34 via the line 33 to distributor 60 and to any other desired part of the system. The combined video and address information is then supplied via the cable 62 to the general purpose computer indicated schematically at 70, which may be, for example, a Xerox Model 530 Digital Computer, and is typically stored in the computer memory for recovery on demand.

A monitor cathode ray tube capable of reproducing color images is indicated at 90. Deflection control voltages are supplied to CRT 90 from generator 30 and cable 31 via the dual channel variable gain amplifier 92 with the gain control knob 93 and with X and Y centering adjustments represented by the single knob 94. Color component video signals for CRT 90 are typically obtained in digital form from distributor 60 on the cable 95, are transformed to analog form by the D/A converter 96, and are supplied to the CRT via the cable 97, the circuit 134, to be described, and the cable 98. Distributor 60 is controllable via the cable 64 from the control logic 80, which is designed to perform predetermined functions under selective control of suitable manual knobs 82. Control logic 80 may be, for example, a Xerox Model 7950 Stored Output Module. For example, distributor 60 may be directed by control logic 80 to supply video signals to CRT 90 directly from scanner 10 or to recover such signals via the cable 63 from the memory of computer 70. Other predetermined functions performed by control logic 80 are described hereinafter.

Figure 2:
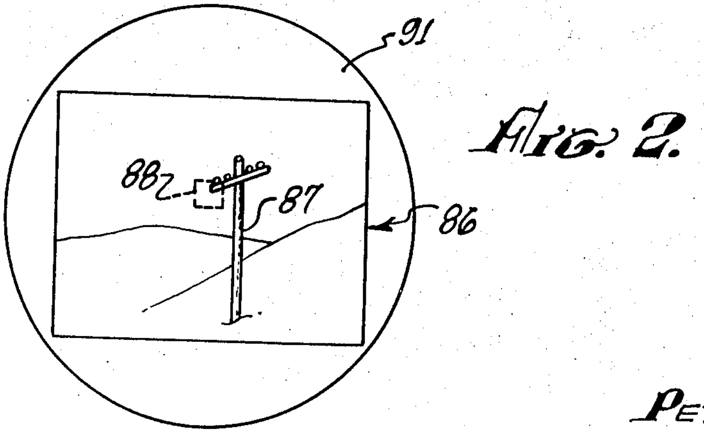
FIG. 2 is a schematic view taken on the line 2–2 of FIG. 1.

The operator is thus enabled to monitor the direct scanning action of scanner 10, or to monitor the picture as actually stored in the computer. Following each step of modification of that picture, the operator can obtain a similar direct display of the result on screen 91, by selecting the predetermined display function of control logic 80. FIG. 2 represents such a display at 86, shown schematicaly as a landscape including a telephone pole 87. By further amplication of the deflection voltages in the variable gain amplifiers 92 under control of knobs 93 and 94, a small section of display 86 indicated at 88 in FIG. 2 may be expanded on the CRT screen, as shown typically in FIG. 3 with exaggeration of the expansion for clarity of illustration, permitting detailed examination of the individual image elements. The rows and columns of those elements are identified by letters and numbers for convenience of reference.

Suitable means of any desired type are provided for permanently recording the images that have been modified. As illustratively shown in FIG. 1, recorder 100 comprises the color cathode ray tube 102 with the screen 103, which is imaged optically by the objective lens 104 upon the color film 106 at 110. That film is supported in a suitable film gate not explicitly shown. Successive frame areas are brought into the optical beam by the film advancing mechanism 108, which is energizable to shift the film in response to a signal supplied via the line 109 from frame sequence control 40. After exposure of film 106, it is developed in conventional manner. CRT 102 receives color component video signals via the cable 111 from the D/A converter 112, to which they are supplied in digital form via the line 113 from distributor 60. Suitable deflection voltages are supplied to CRT 102 via the cable 116 from generator 30, so that the beam deflection is properly coordinated with the video signals for each picture element. Control of the recording action is typically exercised manually by selecting a conventional predetermined recording function in control logic 80 with one or more of the control knobs indicated at 82 on control logic 80. Recording of an image may be done at any time, but is ordinarily carried out only after the desired modification has been completed and visually monitored on CRT 90.

It will be understood that recorder 100 is merely illustrative of a wide variety of available recording systems. In particular, the single CRT 102 may be replaced by separate tubes for each color component. The resulting color images may then be combined optically on a color film such as 106, or may be photographically recorded on separate films and later combined in known manner to form a color picture. Photographic recorder 100 may be replaced by suitable mechanism of known type for recording the modified video information on magnetic tape or other recording medium.

Many techniques are well known for specifying to a computer the address of a particular element of stored information. When the selected element is identifiable visually on the screen of a CRT, as in the present system, a particularly convenient element-selecting mechanism is the light pen, shown schematically at 120 in FIG. 1. The light pen housing contains a lens 124 with a photosensor 122 in the focal plane of the lens. As the housing is moved manually across the CRT screen 91, a selected image element on the screen can be imaged on sensor 122. The pen then generates on the line 126 a voltage pulse in response to momentary appearance of the CRT beam at the selected image element. That pulse is supplied to the gating circuit 128, enabling transmission of the corresponding address signal from line 33 to the line 129 and thence to control logic circuitry 80.

That circuitry includes a suitable register for temporarily storing the address, and circuits for comparing the stored address with the address signals arriving via line 33 during subsequent display cycles. Upon coincidence, an actuating pulse is delivered via the line 132 to the video modifying circuit 134, which modifies the video signal transmitted to CRT 90 in suitable manner, as by intensification or periodic blanking, to render the designated image element visually distinguishable on screen 91. The operator is thereby enabled to monitor the image element whose address has been selected by pin 120 and delivered to circuit 80. After such verification, that address may be transmitted via the cable 136 to computer 70, as by pressing the proper control button 82.

GENERATION OF BOUNDARY ADDRESSES

GENERATION OF INITIAL ADDRESS PAIR

Figure 3:
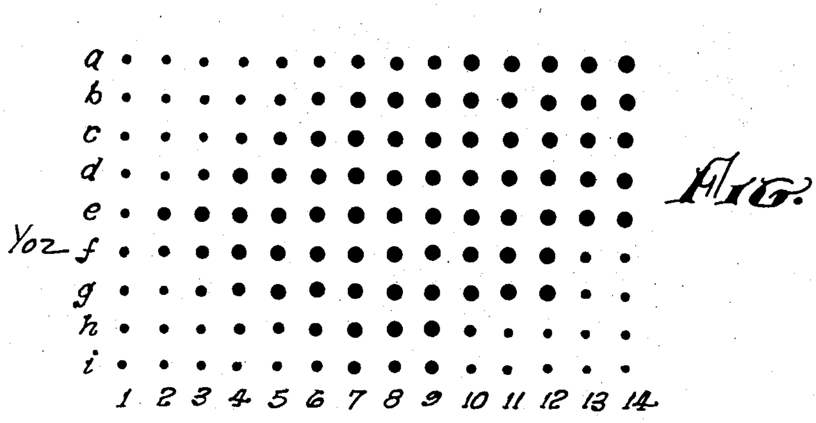
FIG. 3 is a greatly enlarged portion of FIG. 2.
Figure 4:
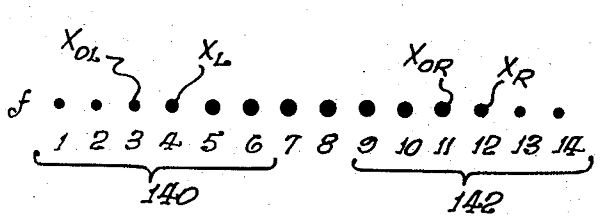
FIG. 4 is a typical scan line selected from FIG. 3.

In accordance with a preferred form of the present invention, the object to be modified, such as telephone pole 87 of FIG. 2, for example, is located in the display on CRT 90, and a horizontal scan line $Y_O$ crossing the object is selected. For illustration it is assumed that the scan line F of FIG. 3 is selected, and that line is shown separately in FIG. 4 for clarity of illustration. Approximate X addresses for the points where that scan line crosses the left and right object boundaries are then identified by means of light pen 120 in the manner already described, and are stored in the computer. Such initial addresses are shown typically at $X_L$ and $X_R$ in FIG. 4.

The computer is then typically programmed, as by construction of a logic statement in conventional manner, to cause the computer to generate a pair of left and right addresses which represent accurately the object boundaries for the selected scan line in accordance with a specified functional relationship of the video values. For that purpose the computer may be programmed, for example, to recover from memory the video values for a set of X addresses which extend a specified distance to left and right of each of the manually selected addresses, for example the sets indicated at 140 and 142 in FIG. 4; to compute a specified function of the video values for each of those addresses; and to compare the computed functions and select for the respective sets the X addresses for which the values best fit the specified relationship. The pair of left and right addresses so selected may differ slightly from the initially selected values $X_L$ and $X_R$, as indicated typically at $X_{OL}$ and $X_{OR}$ in FIG. 4. The computer-selected addresses are then placed in memory as the object boundary addresses for the selected scan line $Y_O$.

The particular function of the video values that is employed for controlling the computer selection of boundary addresses may vary widely with the nature of the object and of the background from which the object is to be distinguished. That function may also depend upon the type of image modification to be carried out. If the object boundary is characterized primarily by a change of luminosity, for example, the selected function may be an average of the three color component video signals. On the other hand, if the object differs from the background primarily in color, the function may be taken, for example, as the computer ratio of two of those signals. The desired function is selected by means of depressing the corresponding pushbutton 82 on control logic 80.

Figure 5:
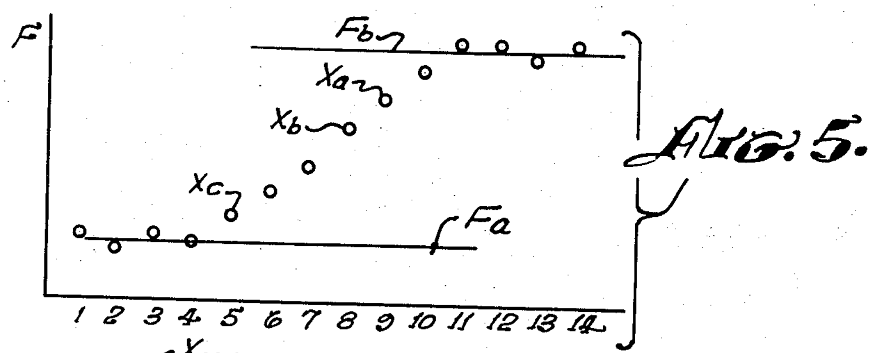
FIG. 5 is a graph representing typical variation of a function of video values at an object boundary.

FIG. 5 is a schematic plot of illustrative assumed values F for a video function computed at a series of image elements extending across a relatively diffuse left boundary of an object. The criterion for selection of the effective boundary may, for example, be taken as the point of maximum slope of the resulting curve, leading to selection of element X*a*. Or the criterion may be defined as the mid-value between the averages F*a* and F*b* computed for defined regions to the left and right of the boundary, leading to selection of element X*b*. It is sometimes preferable to include between the selected left and right boundary addresses all image elements which are significantly affected by presence of the object, leading in the present example to selection of element X*c*, the first element having a function F significantly higher than F*a*. For many types of image modificiation the exact criterion that is employed is less important than the consistency with which the selected criterion is applied.

GENERATION OF ADDRESS PAIRS FOR COMPLETE FRAME

For the second step of address generation, the computer is typically programmed to recover from memory video values for image elements in successive scan lines adjacent the line $Y_O$ prevously considered, including in each line image elements extending a set distance on each side of the X boundary address that was selected in the previous line. For example, after selection of boundary element *f3* as $X_{OL}$, as described in connection with FIG. 4, elements *g1* through *g6* may be recovered from memory, as shown schematically at 144 in FIG. 6. The video values for those elements are then subjected to the same computation, comparison and selection process used for row *f*, leading typically to selection of element *g4*, for example, as the left boundary address $X_{1L}$ for row Y1. A similar selection is carried out for the right boundary to obtain $X_{1R}$. The operation is repeated for successively adjacent scan lines until all scan lines crossing the object have been treated. In that way, pairs of left and right boundary addresses $X_{NL}$, $Y_N$ and $X_{NR}$, $Y_N$ are generated for all scan lines $Y_n$ that cross the selected object.

GENERATION OF ADDRESS PAIRS FOR SUCCESSIVE FRAMES

As a third step of boundary address generation, the computer is programmed to recover from memory video values for suitable sets of addresses in frames successively adjacent the frame initially selected. The video values within each of those address sets are then compared, and the computer selected the ones best satisfying the defined criterion for boundary definition, storing the resulting boundary addresses in the computer memory with suitable identification of the frame number.

Figure 6:
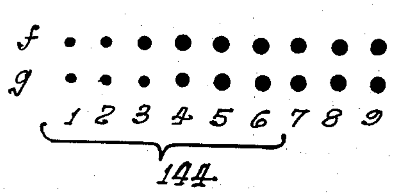
FIG. 6 is similar to FIG. 4, including two adjacent lines.
Figure 7:
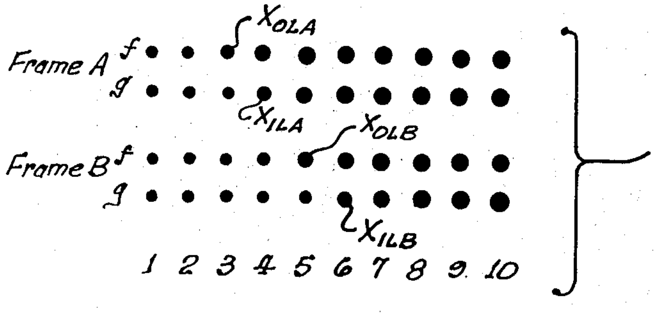
FIG. 7 is similar to FIG. 6, including sections from two adjacent film frames.

FIG. 7 represents that process schematically. The picture portion shown in FIG. 6 is repeated and is designated Frame A. A corresponding portion of adjacent Frame B is added for comparison, the object being shown illustratively as having moved to the right approximately two image elements. Typical selected boundary addresses are indicated in FIG. 7. for both frames A and B, the address designations including letters A or B to indicate that the addresses stored in memory are to be associated with proper digital designations of the frames to which they pertain. Since an object ordinarily moves only a short distance relative to the frame boundaries during the time interval between successive frames, the address sets that are examined in each frame are required to extend only a short distance to left and right from the respective boundary addresses of the preceding frame. That distance may be varied from frame to frame to accord with the nature of the actual object movement.

The program for successive frames is ordinarily designed to apply to the video values of each address set the same selection criterion that was used in selection of the boundary addresses of the initial frame. Thus the object boundaries are followed progressively from frame to frame by programmed action of the computer. If similar boundary shifts between frames are generated on adjacent scan lines, that similarity may be interpreted by the computer as verification of the new postions. Also, since an object has a consistent hue, its red-green-blue ratios will remain constant, and this is also a veritication of correct tracking. Since an object ordinarily changes size only slightly between adjacent frames, it is sometimes useful to program the computer to utilize object size as a secondary criterion in selecting boundary addresses. For example, after locating the left boundary of an object in a new frame, the computer may count to the right the same number of addresses that separated the left and right boundaries in the preceding frame, and utilize the resulting address as the right boundary. Such a procedure is particularly useful when a portion of one boundary is visually indistinct for a few successive frames.

Before the selected boundary addresses for each new frame are finally placed in memory, they are preferably displayed on CRT tube 90 for visual verification in the manner already described. In practice, such verification is typically followed in detail through the first few frames, and then requires only nominal attention unless there is some major change in the nature of the object or in its relation to the background. Under some conditions the object is stationary during a particular series of film frames, and the selected boundary addresses may then be simply duplicated from one frame to the next without the described comparison and evaluation of video values.

If more than one object is to be modified in the same scene, each object is assigned an identifying number and that number is associated with all of the boundary addresses for that object. Operations to be performed may then be assigned by object number.

It may be desirable under certain conditons that all of the described sets of boundary addresses for a scan line, for a frame, or for an entire scene be generated manually under visual control, in the manner described above for the initial address pair. Such an entirely manual operation is feasible, and the resulting addresses are fully satisfactory for defining the area to be subjected to many types of modification. However, the described computer-aided method of address generation, in accordance with the invention, is ordinarily faster and more accurate, and is far less laborious.

IMAGE MODIFICATION

After the computer memory contains a complete set of boundary addresses defining the selected object for the desired number of successive film frames, the computer is typically programmed to recover from memory the video values for all addresses that lie between each pair of left and right boundary addresses, and to perform the desired modification of those video values. That modification is ordinarily carried out one frame at a time, and one scan line at a time within each frame. However, the modification of one frame or of one line may require reference to the video values of adjacent frames or lines to determined or control the specific modification that is to be made at each address. After the computer has performed the specified modification, the modified video values are placed in memory. The modified picture can then be monitored on CRT 90 as already described, and is finally recorded permanently on any suitable record medium, typically on photographic film by means of recorder 100. After final recording of each frame, all values for that frame are typically erased from memory, freeing memory capability for processing additional frames. If desired, the computer may be programmed to carry out several different modifications of a picture, storing separately the resulting video values for each. The resulting pictures can then be monitored comparatively on CRT 90 before selecting the preferred operation.

The process of the invention can be carried out effectively for many types of image modification with a memory capacity only sufficient to handle a moderate number of film frames at one time, three frames being usually the minimum practicable number. Boundary addresses for two adjacent frames are then always available to guide generation of addresses for the next frame. It is generally advantageous, however, to maintain in memory information for as many successive film frames as the memory capacity permits. That limit depends, of course, upon the size of the object being modified and upon other factors of the operation.

A particularly useful type of image modificatin, which well illustrates the effectivenss of the present method, is the elimination from a scene of an object that is not desired. For that purpose the object boundary addresses are selected to include the entire picture area that is affected by presence of the object, as described above in connection with point X*c* of FIG. 5. When the object is surrounded by a background of uniform appearance, such as the cloudless sky behind the upper portion of the telephone pole of FIG. 2, the computer is simply instructed to replace the video values at all points of the object by values derived from a nearby area of the background. If a sky background exhibits gradually changing luminosity or color, the computer can be instructed to obtain video values on both sides of the object and compute an average, which average may be weighted differently as the object is crossed.

If the object to be eliminated shows sufficient movement during the scene, it can be replaced by the precise background objects that were behind it. For that purpose the video signals at each object address for one frame are directly replaced by the stored signals for the same addresses taken from an earlier or later frame in which the object has a different, non-overlapping position. Movement of the background itself between the two frames, as may be caused by camera movement, is compensated by suitably offsetting the addresses from which the background signals are obtained. The proper offset is typically calculated by the computer, for example by comparing addresses for one or more selected background points that are visible in both frames.

When a fixed object is to be eliminated and the adjacent background includes significant detail, the object can sometimes be replaced by an arbitrarily selected adjacent picture section having the same shape as the object. Although that results in repetition of the selected section in the modified picture, such repetition is often not noticeable. That is especially true if the boundary addresses defining the "object" are manually selected to include not only the background that conforms in shape to the nature of the background detail. That entire area, including the object, is then replaced by another background area of the same shape, selected to match the first in general appearance.

The invention is particularly useful for eliminating shadows. For example, two or more shadows are sometimes cast from multiple light sources, whereas only one shadow, as from the sun, is desired. In that case, the shadow to be eliminated is identified by boundary addresses in the same manner as has been described for physical objects. The image modification then comprises an increase in luminosity of each object point, typically without change of hue. However, some adjustment of hue may also be required, for example to compensate for color differences between the two light sources that were used in making the original picture.

The invention is also useful for inserting shadows, especially in connection with composite photography. In such photography the foreground scene is normally photographed against an illuminated backing. The desired background scene is photographed separately, and is later combined with the foreground scene, typically by a conventional photographic compositing process. Compositing of a foreground and background scene can also be carried out electronically, as described and claimed in the copending U.S. Pat. application Ser. No. 801,083, now U.S. Pat. No. 3,595,987, issued on July 27, 1971 to the present applicant and assigned to the same assignee as the present application. Because the two parts of the picture have been photographed separately, a shadow from a foreground object that should have fallen on an object of the background, for example on the ground or on a nearby background wall, is necessarily absent. By assuming the position of a light source, such as the sun, the shape and location of the shadow can be predicted, and can be defined by an address list which varies from frame to frame in accordance with the movement of the foreground object. Such shadow shape and movement can be computed with virtually any desired degree of precision, typically with the aid of computer 70, or may simply be estimated visually and sketched with the light pen in much the same manner that a physical object would be manually outlined. Once an initial shadow form has been sketched, smoothness of shadow movement from frame to frame is readily obtained by utilizing the computer to shift the boundary addresses in a uniform manner. The computer is then programmed to reduce all the video values within the defined boundary sufficiently to produce the desired shadow effect. As with removal of a shadow, some adjustment of hue may also be advantageous, though the hue is far less critical in a fabricated shadow than in an area where a shadow has been eliminated, since the latter must match its surroundings reasonably closely.

A further illustrative type of useful image modification is the introduction of unsharpness or blurring for an entire object that is moving rapidly relative to the frame boundaries. When such an object is photographed with a shutter opening of very short duration, or when an effectively short exposure is produced by means of a flashing or strobe light source synchronized with the camera, the moving object tends to appear in each frame sharply defined and without blur. Projection then sometimes produces an effect of jerky motion, referred to as the "cartoon effect." That effect can be eliminated, in accordance with the present invention, by blurring the definition of the moving object, both as to its boundaries and as to internal detail that it may have, while preserving normal sharpness of other objects in the scene having only normal movement. That is typically accomplished by programming the computer to modify the video signal at each object address by substituting the average of the values at a series of addresses extending for a short distance on each side and in the general direction of the object movement. The length of the address string over which the average is taken is made to vary in proportion to the distance moved by the object between adjacent frames. That distance can be determined by the computer by comparison of the boundary addresses for each pair of adjacent frames. If the movement is approximately horizontal each address string extends along a scan line. If not, the computer is instructed to select suitable addresses in adjacent scan lines. In computing the average for each string, the resulting blur effect is more realistic if the average is weighted to favor addresses close to the center of the string. However, such refinements are seldom required except under unusual conditions.

The invention is also effective for introducing diffusion of specialized kinds, for example to eliminate wrinkles and lines in a face without affecting sharp definition of desired features such as the eyes. For that purpose, the computer is typically instructed to compute for each point the average of the video values at a series of addresses extending on each side of the point. However, that average is preferably not used directly as the new video value at the point, but rather as a threshold limit, the new value being unchanged except that it is not allowed to be less than the threshold. Alternatively, the new value may be limited to a specified short range above and below the computed average, initial variations within that range being unaffected. Such modification produces an effect of smoothing sharp variations without destroying the impression of sharp definition. If the video values for each point are replaced by the computed average, as described in the previous paragraph, the effect is one of diffusion, which also tends to hide wrinkles and may sometimes be preferred. Although the portion of the face containing wrinkles is not always separated by a clearly visible boundary from features to be excluded, such as the eyes, the boundary of the area to be treated can be defined initially entirely by use of the light pen, preferably drawing the boundary in areas of relatively uniform tone. The exact position of the boundary is then immaterial, since the modification to be made leaves uniform areas unchanged. Such boundary addresses are then supplemented by defining auxiliary critical points or lines that are visually distinguishable, the movement of which is similar to the movement of the areas to be treated. The computer is then programmed to detect movement of the auxiliary points from frame to frame, and to adjust the boundary addresses for the area to be treated correspondingly.

The invention is also effective for modifying the color of a particular object or of selected objects without changing the remainder of the picture. For example, the computer is programmed to recover from memory the video values for all object points as defined by the stored boundary address list and to compute the ratios of the intensities of the three color components at each point. The computer is further directed to modify the values for one or more of the color components in such a way as to produce a defined change in those ratios, typically without altering the overall brightness.

An especially useful operation that can be performed in accordance with the invention is to introduce selected colors into a motion picture scene that was originally photographed in black and white. Each object is typically handled separately in the manner already described, and the computer is instructed to produce, or each point of that object, color component video signals having specified ratios corresponding to a selected hue and having overall brightness corresponding to the black and white video signal of the original picture.

The present invention further permits the virtual elimination of random noise such as film graininess and dirt particles from a motion picture scene despite relative movement of the various picture objects. After a moving object has been identified by means of stored lists of boundary addresses for the respective frames of a scene, as already described, the individual image elements of the object can be followed from frame to frame by reference to the movement of those boundary addresses. That is, the address lists serve as a framework by which corresponding image elements in successive frames can be identified. In absence of noise such corresponding elements normally have essentially constant video values from frame to frame, so that any abrupt departure from such constancy can be identified as noise and can be largely eliminated by suitably averaging or limiting the video values.

More particularly, each image element within a moving object is assigned, in addition to its regular X, Y address, a relative address that defines its relative position within the object. For object movement parallel to the scan lines, for example, that relative address is typically computed as the ratio of the distances along a scan line from the image element to the left and right boundary addresses for that scan line. That is, in successive frames the object points that are two thirds of the distance, say, from the left to the right object boundaries along the same scan line all correspond to the same point of the object. With such a definition, changes in apparent width of the object from frame to frame tend to be automatically compensated.

For noise minimization the computer is typically programmed to compute relative addresses for all points within each independently moving object, and then to compute, for each frame, the average of the video values for each relative address taken over a series of adjacent frames, preferably centered on the frame in question. The computer is further instructed to replace each actual video value by the computed average. Such substitution does not reduce the sharpness of definition of any real fine structure within the object, since each average applies only to a single point of the object. However, such averaging does reduce the apparent graininess by approximately the square root of the number of values averaged, so that averages extending over only three or five frames, for example, produce appreciable improvement in picture quality. Other functions than a simple average can be used, such as a root mean square value, for example, or each video value may be limited by imposing threshold levels above and below the computed average.

We claim:

1. The method of modifying a previously recorded motion picture scene, comprising in combination the steps of deriving from each frame of the recorded motion picture scene a video record of the same, deriving and storing in a computer a plurality of image element digital video values and associated image element addresses that represent the video record, displaying at least a portion of a selected frame, under control of the video values, selecting in the display a picture area bounded by a change of luminosity or hue and representing an object to be modified, storing in the computer a series of boundary addresses that enclose the addresses for the selected picture area, programming the computer to generate and store corresponding series of boundary addresses for respective successively adjacent frames of the scene, programming the computer to perform for each frame a designated modification of only those video values having addresses enclosed by the series of stored boundary addresses, and recording the so modified and any unmodified video values as a modified motion picture scene.

2. The method defined in claim 1, and in which said computer generation of boundary addresses includes comparing for each successive frame the stored video values for rows of addresses that extend transversely of the boundary at points corresponding to respective recorded boundary addresses of the previous frame, and selecting for each row the address that meets a predetermined relation derived from said change of luminosity or hue.

3. The method defined in claim 1, and in which said computer modification of the video record comprises computing a predetermined function of the video record values for a plurality of image element addresses adjacent each said enclosed address, and modifying the video record value at that enclosed address in accordance with such computed function.

4. The method defined in claim 1, and in which said computer modification of the video record comprises computing a predetermined function of the video record values at a group of image element addresses external of each series of stored boundary addresses, and modifying the video record values at said enclosed addresses in accordance with such computed function.

5. The method defined in claim 1, and in which said computer modification of the video record comprises designating for each frame to be modified a reference frame in which said object is positioned in nonoverlapping relation to its position in the frame to be modified, and replacing the video record value at each said enclosed address in each frame to be modified by the video record value at the corresponding address in the designated reference frame.

6. The method defined in claim 1, and in which said computer modification of the video record comprises computing for each image element within an object a relative address representing the position of the image element relative to the series of boundary addresses for each frame, and replacing the video value at each relative address in each frame by a predetermined function of the video values at the same relative address in a series of adjacent frames.

* * * * *